(12) United States Patent
Bard et al.

(10) Patent No.: US 12,391,379 B2
(45) Date of Patent: Aug. 19, 2025

(54) PERSONAL FLYING APPARATUS INCORPORATING A HARNESS AND METHOD OF FACILITATING HUMAN FLIGHT

(71) Applicants: Maurice Rheal Bard, Scarborough (CA); Kasha Aniela Noga Bard, Scarborough (CA); Ella Teresa Noga Bard, Scarborough (CA)

(72) Inventors: Maurice Rheal Bard, Scarborough (CA); Kasha Aniela Noga Bard, Scarborough (CA); Ella Teresa Noga Bard, Scarborough (CA)

(73) Assignee: Maurice Rheal Bard, Scarborough (CA)

( * ) Notice: Subject to any disclaimer, the term of this patent is extended or adjusted under 35 U.S.C. 154(b) by 0 days.

(21) Appl. No.: 18/370,152

(22) Filed: Sep. 19, 2023

(65) Prior Publication Data
US 2024/0002051 A1 Jan. 4, 2024

Related U.S. Application Data

(63) Continuation of application No. PCT/CA2023/050220, filed on Feb. 23, 2023.
(Continued)

(51) Int. Cl.
*B64C 39/02* (2023.01)
*B64C 31/028* (2006.01)
*B64C 33/02* (2006.01)

(52) U.S. Cl.
CPC .......... *B64C 39/026* (2013.01); *B64C 31/028* (2013.01); *B64C 33/02* (2013.01)

(58) Field of Classification Search
CPC ....... B64C 31/028; B64C 33/00; B64C 33/02; B64C 33/025; B64C 39/026
See application file for complete search history.

(56) References Cited

U.S. PATENT DOCUMENTS 3,173,629 A * 3/1965 Uhor ...................... B64C 29/00
244/4 A
11,155,350 B2 * 10/2021 Kuntz ...................... B64B 1/62
(Continued)

FOREIGN PATENT DOCUMENTS

| CN | 209410328 U | 9/2019 |
| GB | 1093720 A | 12/1967 |
| WO | 2014028083 A2 | 2/2014 |

OTHER PUBLICATIONS

Written Opinion and Search Report issued on corresponding PCT application PCT/CA2023/050220, dated May 11, 2023.

*Primary Examiner* — Nicholas McFall
(74) *Attorney, Agent, or Firm* — Christopher N. Hunter; Laurie C. Wright; Blake, Cassels & Graydon LLP

(57) ABSTRACT

The disclosure pertains to a battery-powered personal flying apparatus comprising a body structure adapted to support and detachably couple user thereto, and a pair of wings rotationally coupled to opposite sides of the body structure. The wings preferably comprise at least a humerus portion and radius portion. The radius portion is configured to rotate relative to the humerus and, during use, the wings mimic the motion of bird flight. The disclosure further pertains to a method of facilitating human flight using the personal flying apparatus comprising the steps of maintaining the user's torso and legs in an inline and generally horizontal position, moving a pair of wings having a humerus rotatably coupled to a radius simultaneously through a wing flight pattern, and repeating the wing fight pattern to maintain flight of the user.

10 Claims, 18 Drawing Sheets

Related U.S. Application Data

(60) Provisional application No. 63/314,068, filed on Feb. 25, 2022.

(56) References Cited

U.S. PATENT DOCUMENTS

| | | | | |
|---|---|---|---|---|
| 2021/0354817 A1* | 11/2021 | Justel | ..................... | B64C 33/00 |
| 2024/0278913 A1* | 8/2024 | Wada | ..................... | B64C 13/16 |

* cited by examiner

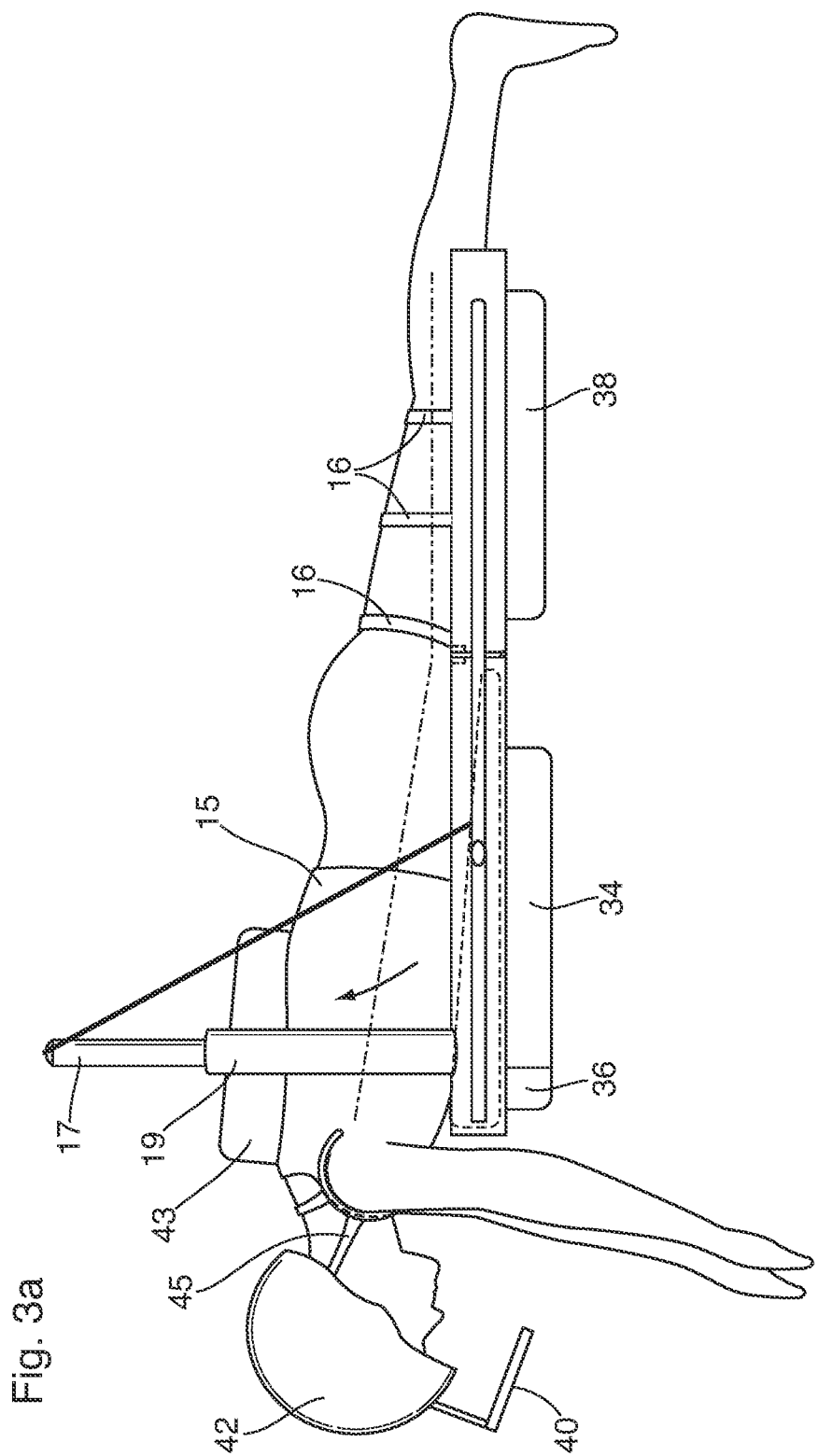

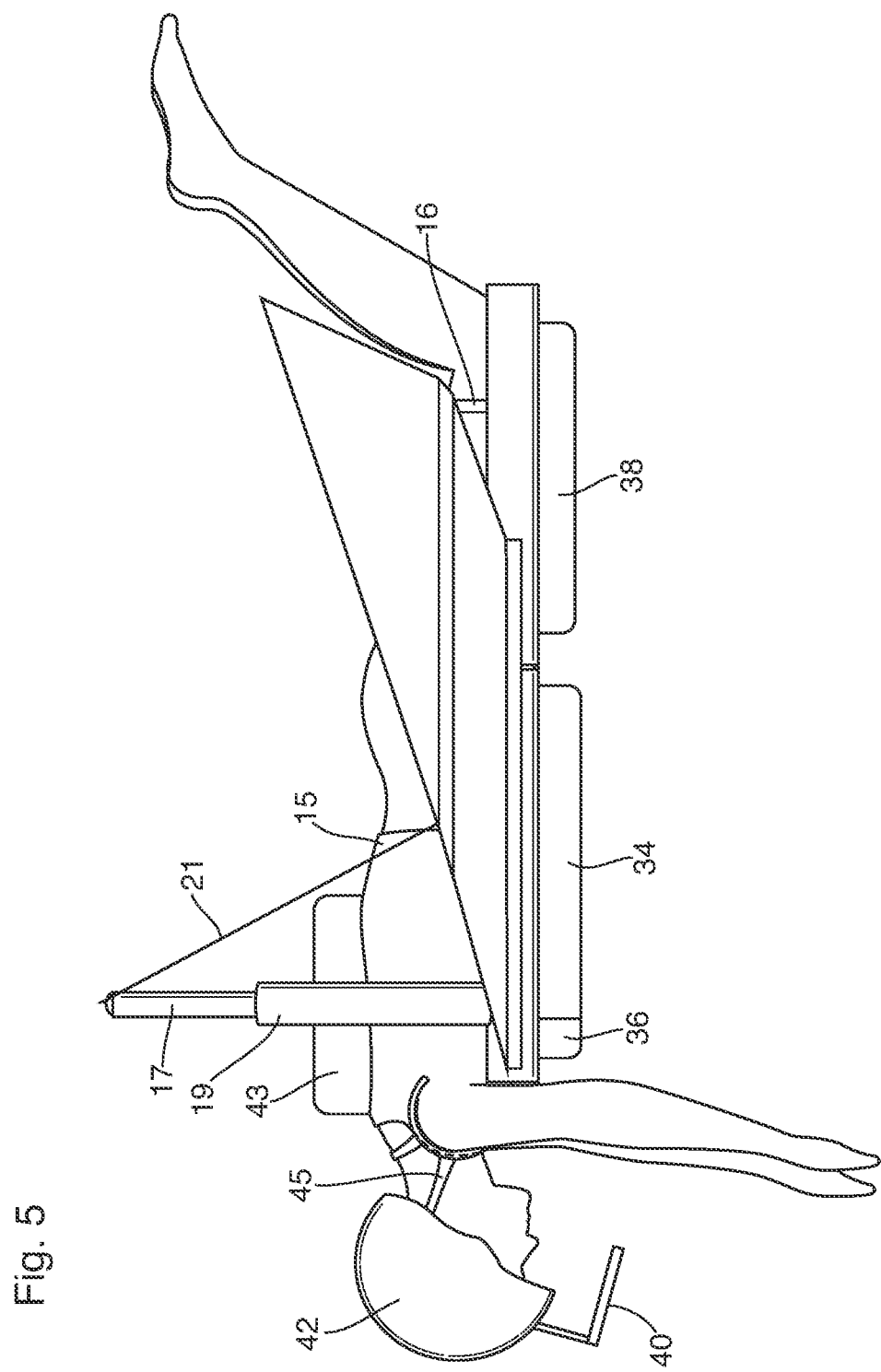

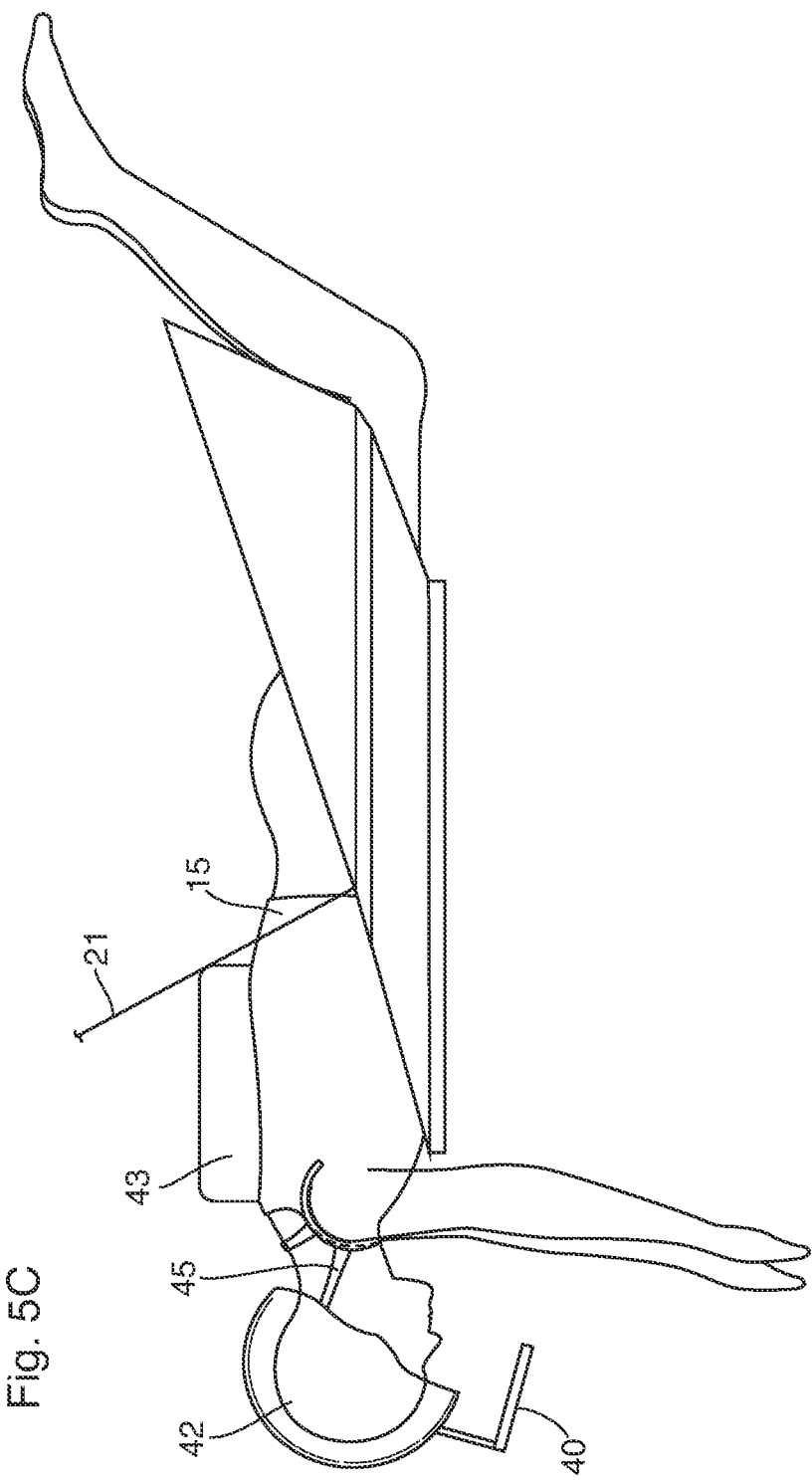

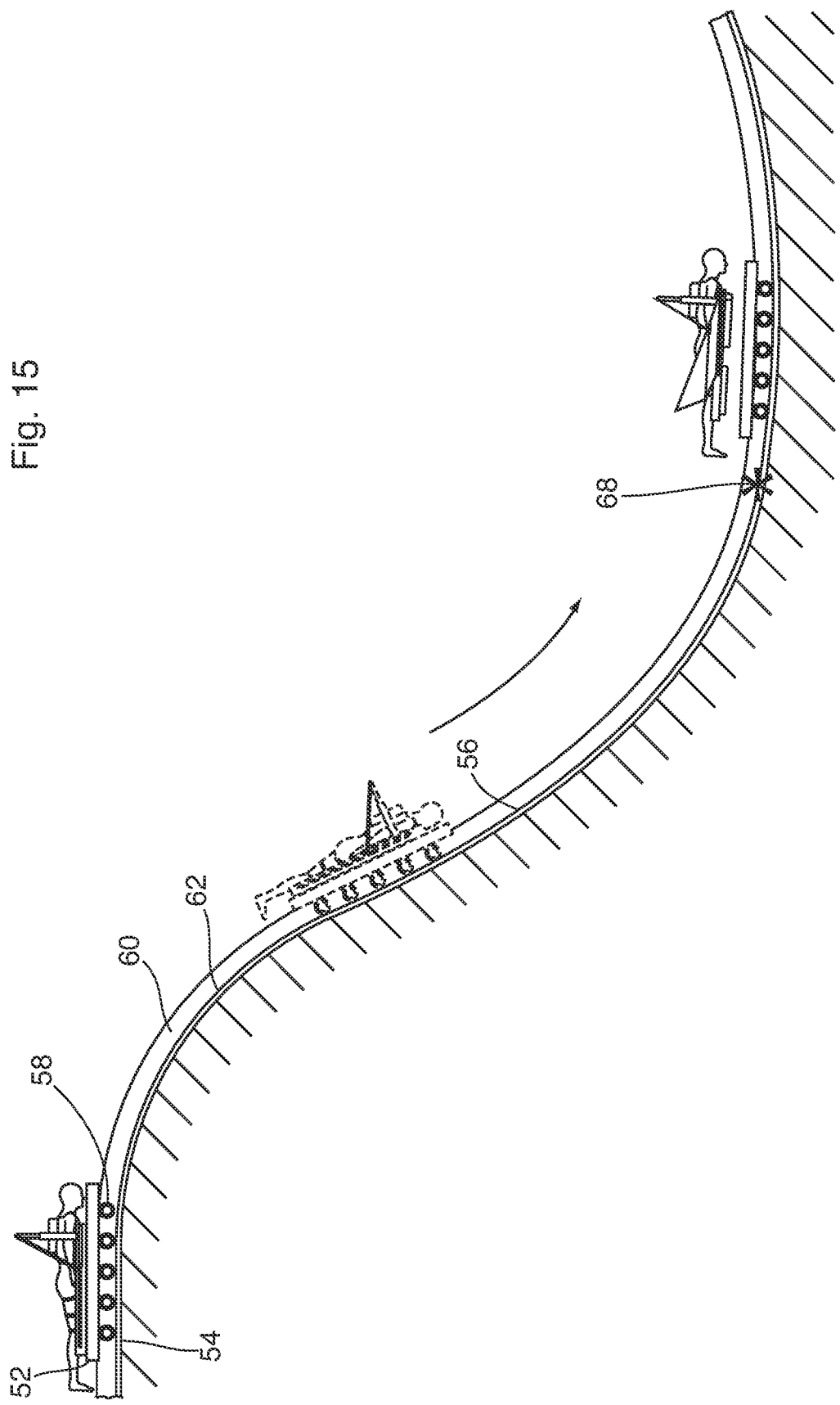

PERSONAL FLYING APPARATUS INCORPORATING A HARNESS AND METHOD OF FACILITATING HUMAN FLIGHT

FIELD OF THE DESCRIPTION

The description pertains to an apparatus for facilitating personal flight. More specifically, the description pertains to an apparatus incorporating a harness configured to couple a human to a wing structure capable of a flight pattern that mimics bird flight patterns. The personal flying apparatus being powered by battery or other external power input.

BACKGROUND

For decades, people have been seeking new and innovative ways to fly. Known personal flying devices in the form of single person aircrafts have been used for military applications. However, these aircrafts are typically powered by combustion engines and require complex set ups or long runways for take off and landings. Military applications have a particular need for personal flying devices to move troops in areas with difficult terrain where personal aircrafts can not land or take off and parachute drops are not possible. Recently, there has been some development in personal jet packs to move troops to hard-to-reach locations. These jet pack devices require fuel and are loud. They do not allow for the movement of troops with stealth. There remains a need for battery powered, quiet personal flying devices with a simplified landing and take off techniques.

Furthermore, flying-related sports have been well documented through time. For example, hang gliders became popular in the 1980s as a non-motorized air sport. More recently, there has been an increase in popularity of base jumping or skydiving while wearing a wingsuit. Wingsuits allow a flyer to direct their fall using a specially designed inflatable suit. The suit is essentially a jumpsuit with pieces of material between a flyer's arms and legs to increase body's surface area and increase air resistance during the fall. This wingsuit design enables a user to air-glide more easily and thus simulate flight. This method of flight mimics the fight of a flying squirrel which uses the skin flaps between its arms, legs, and body to glide through a forest's tree canopy. Many wingsuit users participate in base-jumping. In base-jumping, the flight is initiated with a user launching themselves from a high place and then using the special inflatable flying suit, glide freefall to the ground. Other wing suit users jump from a small airplane, or helicopter, and launch their skydive glide by jumping into mid-air.

These popular flying sports are not motorized and rely on the user's skill to keep the athlete safe. In view of the extreme risk and skill associated with these sports, much of the population is hesitant to participate in these non-motorized flying sports. There have been some advances in motorized flying apparatuses. For example, United States Patent Application Publication number 2014/0014766 discloses an airplane-like flying apparatus with a roll cage on the bottom thereof that holds a in a prone position. The user manipulates the controls with their feet and hands to take off, land, preform acrobatics and direct the aircraft. The craft uses an electric motor to power a propeller located aft of the cockpit and tail section as a pusher style propulsion system.

There has been further development in the field of ultralight aviation. Most of these aircrafts feature a single seat vehicle hanging downwardly from a hang glider like structure. These ultralight aircrafts are typically powered by small combustion engines.

Both embodiments of motorized personal aircrafts replicate airline or glider flight. A personal flying apparatus which replicates a more natural or bird-like motion would bring diversity and a new experience in the field of air-based sports. It can be assumed that bird flight may be an efficient method of flight as evolution of the wing motion of most large birds is an efficient way to channel air for flight.

There has been significant development in the field of unmanned drones, particularly drones which emulate birds. One ornithopter has been developed by the GRIFFIN project has recently demonstrated the ability of an unmanned ornithopter to autonomously fly and land without user input.

Projects such as the GRIFFIN project and other ornithopter drones demonstrate that bird-like flight is feasible using current materials and power sources. However, there has been very little research into how an ornithopter could be used to facilitate human flight. While one major advantage of an ornithopter is the ability to react to wind currents and using a combination of flapping and gliding to conserve energy, there are some areas in which the current Artificial Intelligence (AI) governing ornithopters requires improvement or human input. Unpredictable or infrequent environmental conditions can be a challenge for the AI as it has not had enough training to properly respond. Combining the athleticism of a human with the AI of ornithopters could be beneficial and have many practical applications.

SUMMARY OF THE DESCRIPTION

The disclosure pertains to a personal flying apparatus comprising a body structure adapted to support and detachably couple a user thereto, and a pair of wings rotationally coupled to opposite sides of the body structure.

In another embodiment, the wings comprise at least a humerus portion and radius portion. The radius portion is configured to rotate relative to the humerus and, during use, the wings mimic the motion of bird flight.

In another embodiment, the body structure comprises a torso portion and a leg portion and the leg portion is hingedly coupled to the torso portion. The leg portion rotates freely relative to the torso portion during an upright take off phase and a landing phase of flight and is fixed in an inline position thereto during flight. It should be noted that the leg portions may be fixed relative to the torso if a ramp method of take off is used.

In a further embodiment, the torso portion comprises a harness configured to hold a user therein and a pair of torso supports positioned at opposite lateral sides of the harness. The pair of wings are rotationally coupled to the pair of torso supports respectively.

In a further embodiment, the leg support comprises a pair of leg struts configured to be coupled to a user's legs. The leg struts being selectively free to move independent of one another and rotate relative to the torso struts.

In a further embodiment, the pair of wings extend backwardly from a front portion of the pair of torso struts to a rear portion of the leg struts to extend generally the length of the struts and flexible material.

In a further embodiment, the pair of wings each include a series of structural braces extending rearwardly from the humerus and radius to provide structural support. In another embodiment, the structural braces extend both direction for strength. The structural braces are curved to provide a concave bottom surface of the of wings.

In a further embodiment, the pair of wings each include at least one adjustable louver to facilitate changes in wing length or shape.

In a further embodiment, wings are biased to an upward position.

In a further embodiment, the personal flying apparatus further comprises a central processing unit for controlling the motion of the pair of wings.

In a further embodiment, the personal flying apparatus further comprises a series of sensors for sensing elevation, and possible obstacles. The sensors are used as input to the central processing unit and the central processing unit uses the sensor input to determine if a change in flight path is necessary.

In a further embodiment, the personal flying apparatus further comprises a user interface to receive input from the user. The input being processed by the central processing unit to control the flight experience.

In a further embodiment, the user interface is in the form of a screen mounted on a helmet.

In a further embodiment, the battery is a lithium-ion battery.

In a further embodiment, the battery is a silicon-dominant battery.

The disclosure further pertains to a method of facilitating human flight using the personal flying apparatus comprising the steps of:
1. maintaining the user's torso and legs in an inline and generally horizontal position;
2. moving a pair of wings having a humerus coupled to a radius simultaneously through a wing flight pattern;
3. Repeating the wing fight pattern to maintain flight of the user.

The wing flight pattern comprising at least 4 phases: a preliminary decent phase, a radius decent phase, a preliminary return phase and a final return phase. The preliminary decent phase comprises lowering the humerus and radius in a generally inline manner, and the radius decent phase comprises a downward rotation of the radius relative to the humerus at a rate above the decent rate of the humerus. Finally, the preliminary return phase comprises an upward rotation of the humerus, while the final return phase comprises an upward rotation of the radius relative to the humerus.

In a further embodiment, the method further comprises rotating the humerus relative to the torso support in a longitudinal plane of the personal flying apparatus.

In a further embodiment, the rotation motion generally follows and elliptical pattern.

In a further embodiment, the method further comprises rotating the humerus backwards and upwards relative to the torso support in the return and rise phase and rotating the humerus forward and downwardly through the elliptical pattern during the radius decent and power phases.

BRIEF DESCRIPTIONS OF THE FIGURES

The features of certain embodiments will become more apparent in the following detailed description in which reference is made to the appended figures wherein:

FIG. 3a is a left side view of the personal flying apparatus with the user secured therein wherein the user torso is slightly elevated;

FIG. 5 is a left side view of the personal flying apparatus with the user secured therein showing possible battery location;

FIG. 5c is a left side view of the personal flying apparatus with the user secured therein;

FIG. 15 is a side view of the ramp take of method.

DETAILED DESCRIPTION

In efforts to reproduce energy efficient flight and provide the user with a new a unique experience, the following discloses a personal flying apparatus 2 which mimics the biomechanics of bird flight. Such a personal flying apparatus would have many useful applications. Since the proposed personal flying apparatus has an ornithopter-based design, it is devoid of spinning rotors. This makes the apparatus safer for human use and allows for a user to come in closer contact with other humans, animals, structures, or other aspects of their environment to which a rotor-based mechanism would pose a safety risk. Furthermore, the lack of spinning rotors makes the personal flying apparatus quiet and unobtrusive. This would be advantageous in wildlife observation or in military applications where stealth is necessary. Finally, two independently operable wings, combined with human athleticism, provide for excellent maneuverability.

Figure 1:
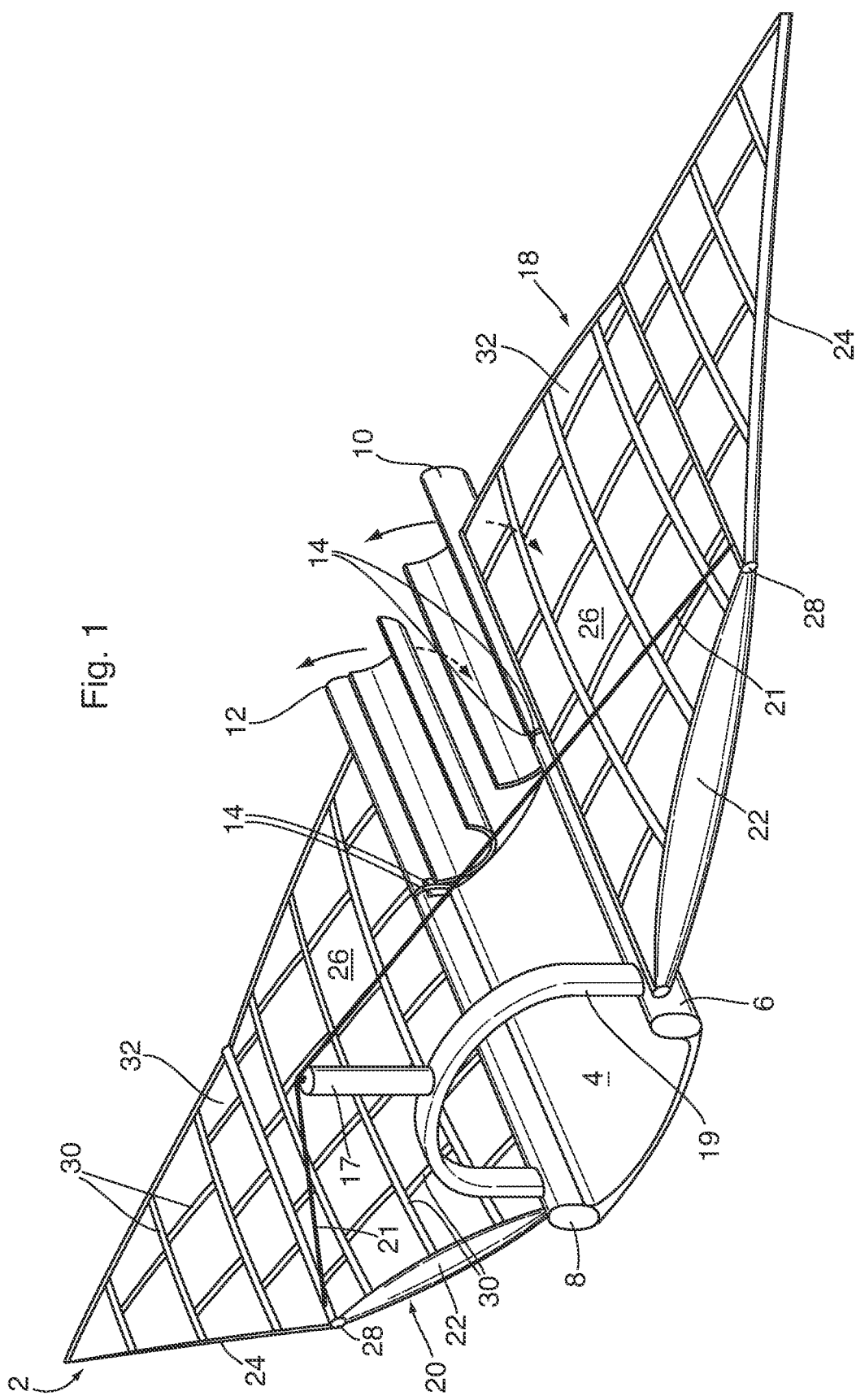
FIG. 1 is a perspective view of the personal flying apparatus.
Figure 2:
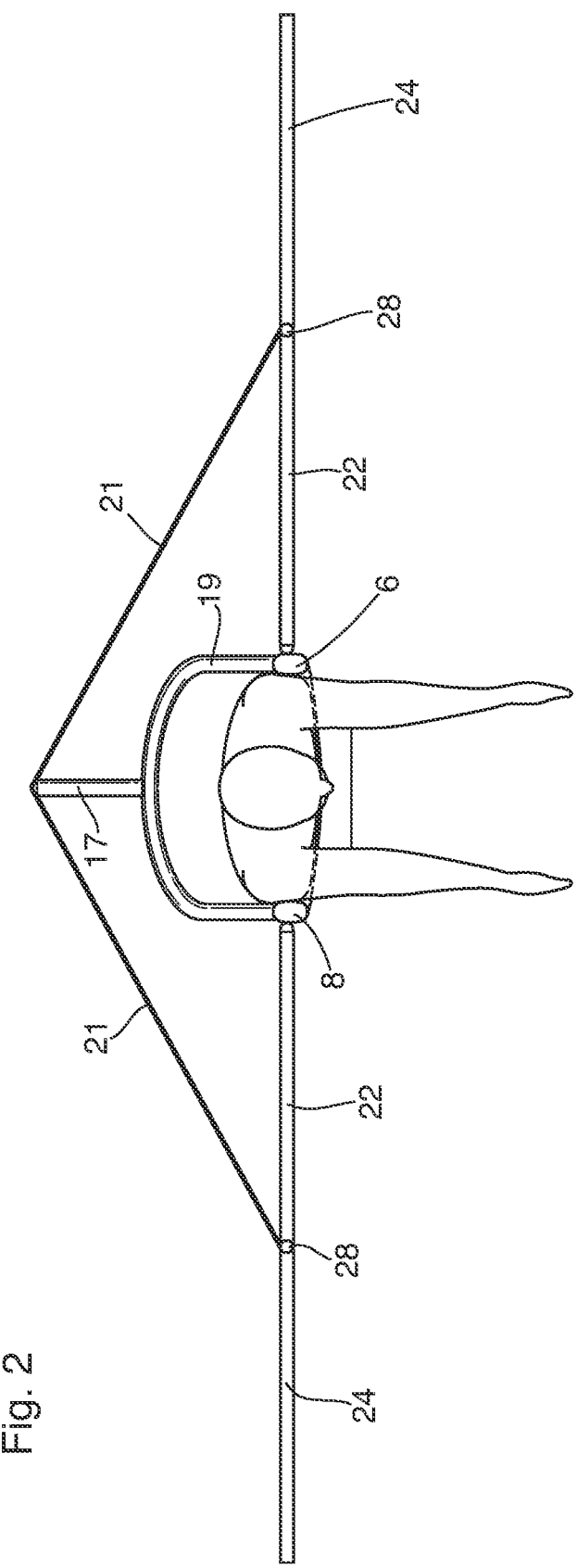
FIG. 2 is a frontal view of the personal flying apparatus with the user secured therein.
Figure 3:
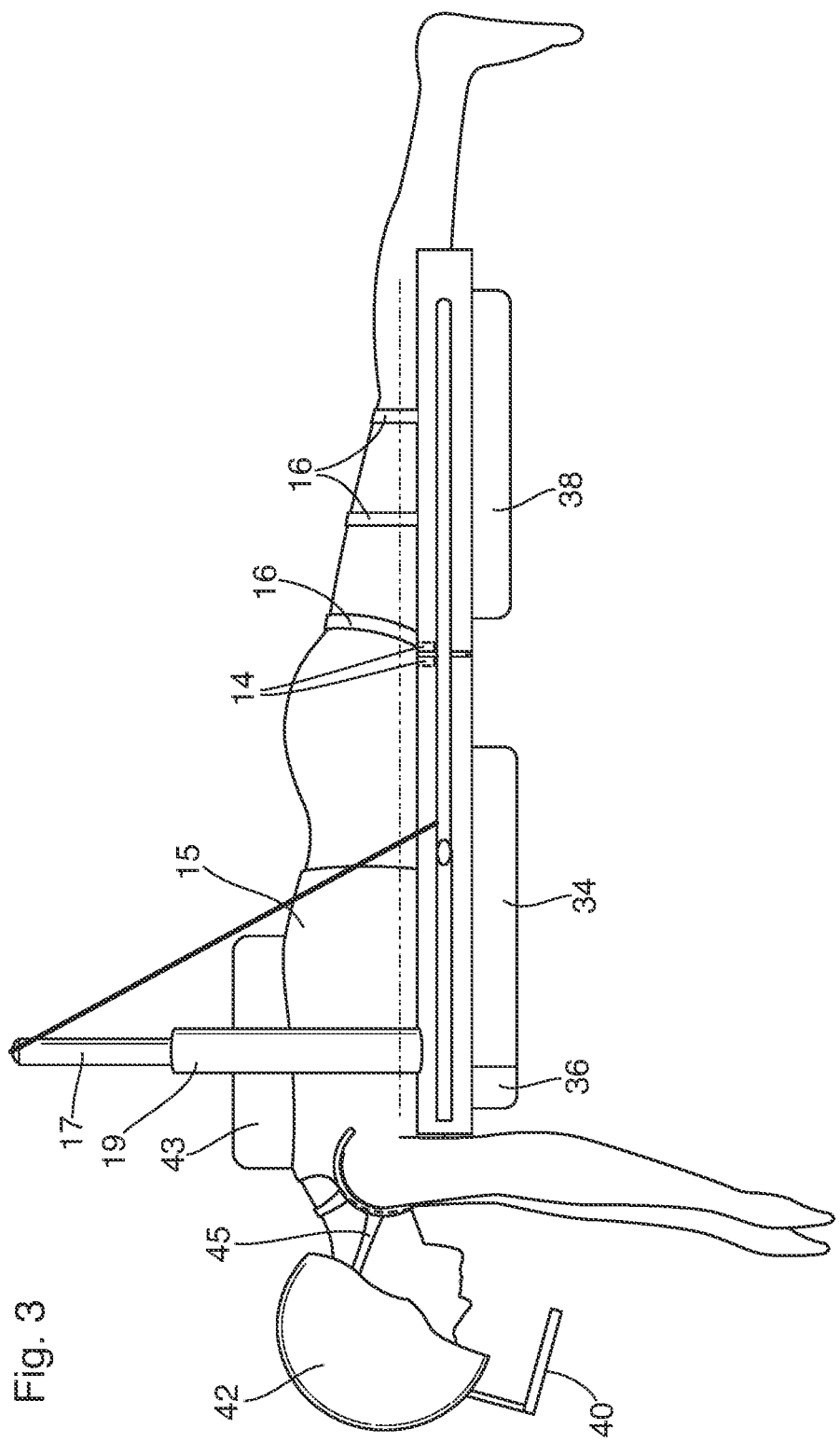
FIG. 3 is a left side view of the personal flying apparatus with the user secured therein.
Figure 4:
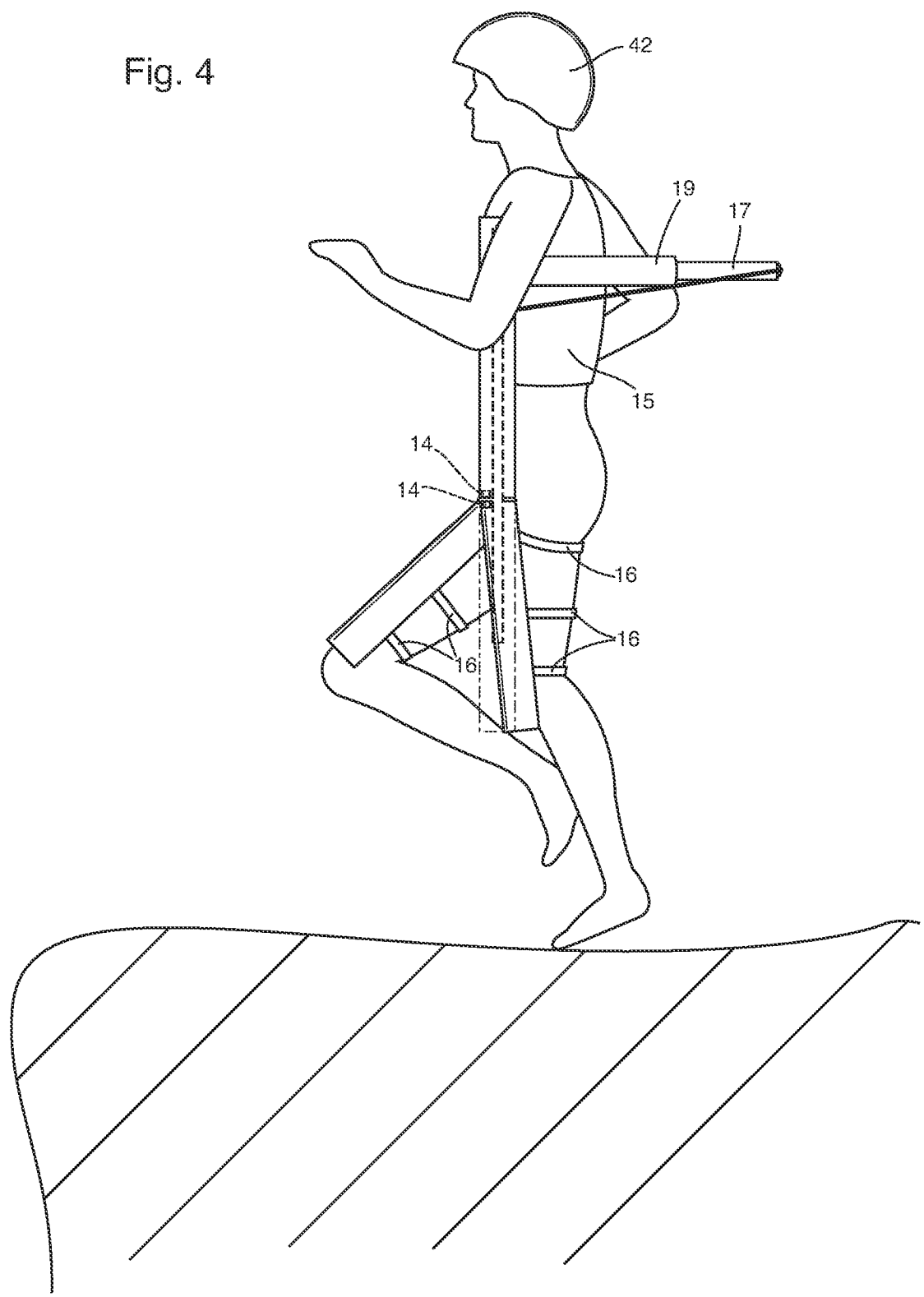
FIG. 4 is a left side view of the personal flying apparatus during take off with the user secured therein.

The disclosure pertains to a personal flying apparatus which facilitates flight using bird-like flight biomechanics. FIG. 1 shows one embodiment of the flying apparatus 2. The apparatus 2 has a main body structure, which includes at least a torso support 4 positioned between a first torso strut 6 and a second torso strut 8. When in use, an athlete rests their torso in a prone position on this torso support 4 between the first torso strut 6 and second torso strut 8. This configuration is shown in FIG. 3. The torso support can be made of any suitable material, for example, a fabric sling, or a lightweight composite. While the torso struts are shown as one example of a structure that could be used to couple the wings to an athlete, it can be appreciated that other structures may also be suitable. For example, a more robust torso support 4 may be used to support the user and would also function as additional structural support for the wings. The torso support includes a securement method to couple the athlete to the torso support 4. Methods of securement would be known to a person skilled in the art, however, in a preferred embodiment, the method of securement is a full harness 15 as shown in FIG. 4. As can be understood, the harness 15 preferably includes methods of adjusting the size and a method of securement therein. However, in another embodiment, the harness 15 is sized to fit a particular athlete and is not adjustable in size. In yet another embodiment, the harness is made of a rigid material to facilitate increased stability of the wings relative to the athlete.

Figure 5A:
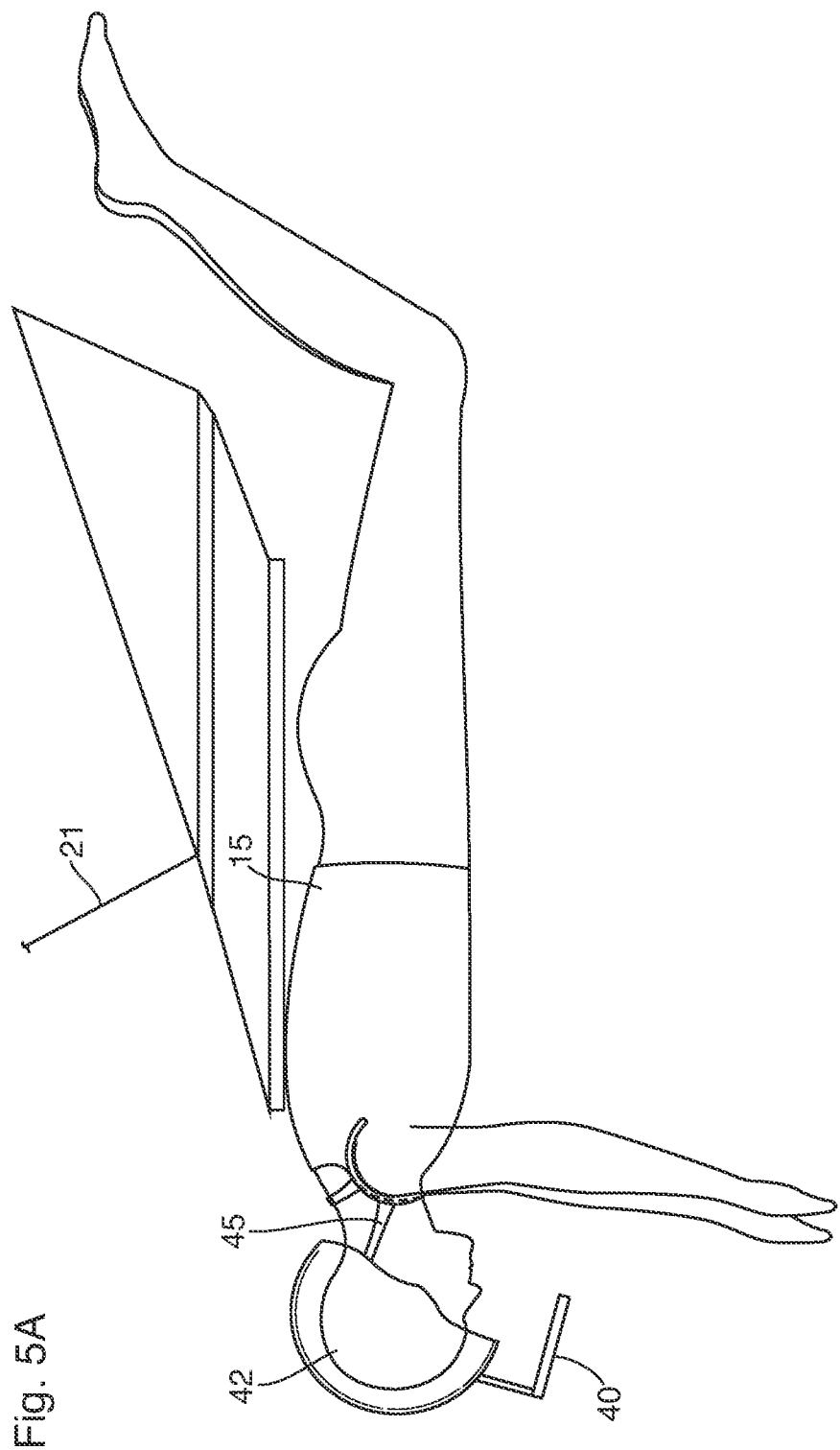
FIG. 5a is a left side view of the personal flying apparatus with the user secured therein showing an embodiment wherein the harness being located below the wing structure.
Figure 5B:
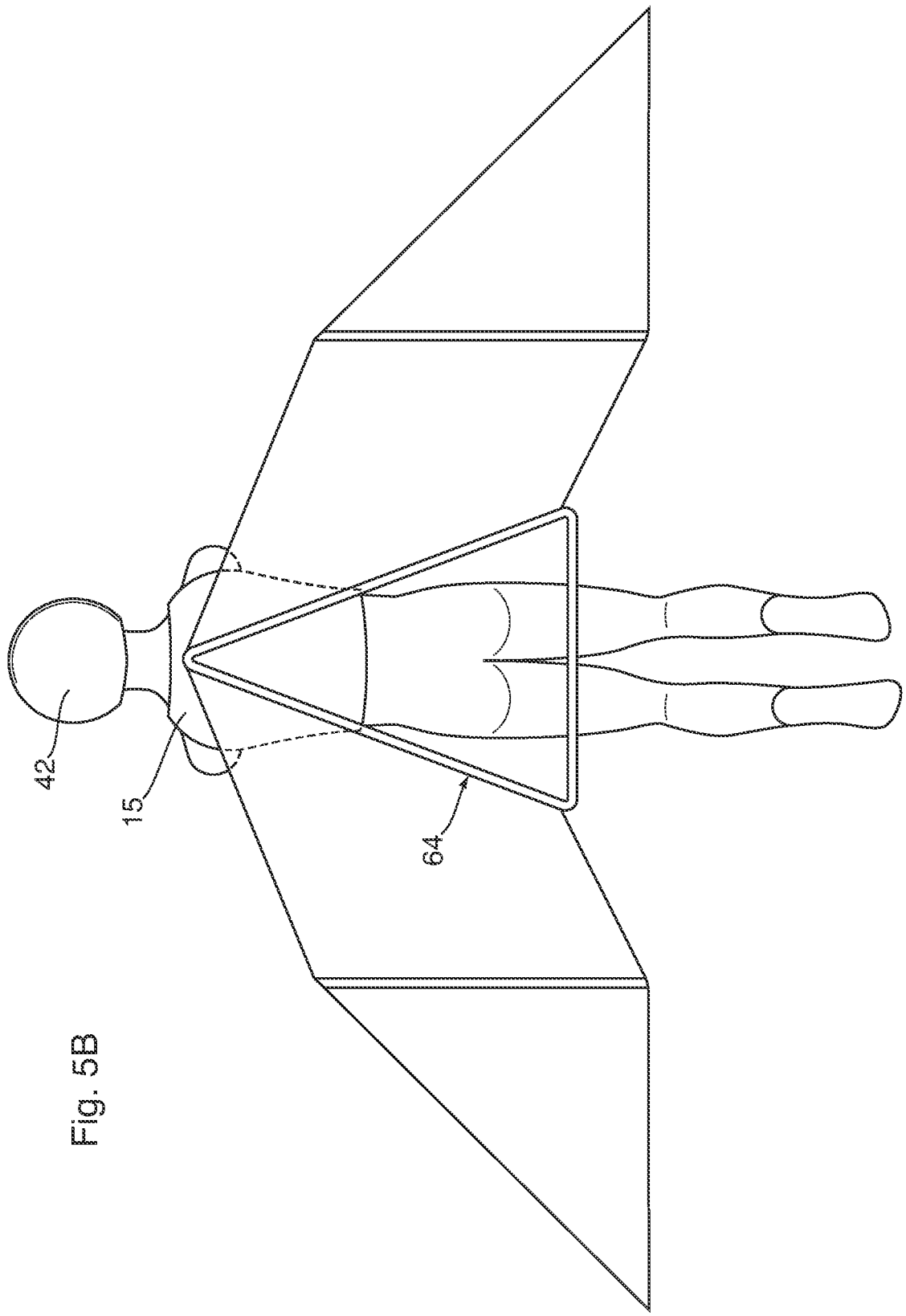
FIG. 5b is a top view of the personal flying apparatus with the user secured therein showing an embodiment wherein the harness is located below the wing structure.

In an alternative embodiment, the skeleton of the wing structure and the wing itself could be positioned below the harness or above the harness as shown in FIGS. 5C and 5A, respectively. In these embodiments, the wings are optionally coupled via a central support 64 as shown in FIG. 5B. In the preferred embodiments shown in the figures, this central support is triangular in shape, however, it can be appreciated that alternative shapes and structures of the supports could be used.

The flying apparatus 2 further includes leg braces 10 and 12 for support the legs of a user in a prone position. The leg braces 10 and 12 are preferably hingedly connected at 14 to the first torso strut 6 and second torso strut 8, respectively. In a preferred embodiment shown in FIG. 3, the leg braces are coupled to each of the legs of the user via one or more straps 16 or alternative fixation method. The leg braces 10 and 12 preferably are positioned on the front and/or lateral side of the user's thigh and extend to or past the user's knee. In preferred embodiments, the leg braces 10 and 12 are designed to accommodate anatomical features of the user (including but not limited to kneecaps and thigh length) and variability in user height and stature. It is preferred that the leg braces 10 and 12 are configured to allow the knee to move in a relatively unimpeded manner.

The hinged connection 14 allows an athlete to move their legs relative to the torso struts 6 and 8, allowing the athlete to run. This is particularly useful for preferred landing and takeoff techniques. Once an athlete is in the air, the hinged connection locks into place to keep the user in a prone position from torso to knee. The hinged connection 14 can be of any configuration known to a person skilled in the art. Examples of locking mechanisms include, but are not limited to, pin and slot, magnetic, or electro-magnetic couplings. In one embodiment, the hinged connection is auto locked in place once the athlete is in flight. Alternatively, the athlete can activate the locking mechanism with a particular motion or through a user interface as discussed below. In this embodiment, it can be appreciated that an onboard processing unit would auto lock the hinged connection 14 should the athlete fail to lock the leg braces 10 and 12 to the torso struts 6 and 8 respectively.

In the preferred embodiment, the leg braces 10 and 12 are locked in an in-line manner with the torso struts 6 and 8 respectively. However, in an alternative embodiment shown in FIG. 3a, the torso struts 6 and 8 are angled upward relative to the leg braces 10 and 12. This position allows and athlete to have a more complete frontal view during flight.

The leg braces 10 and 12 and torso struts 6 and 8 are coupled on each side of the athlete to wings 18 and 20. The wings are designed to mimic the shape and mechanics of a bird. In a preferred embodiment the wings 18 and 20 are comprised of two distinct sections: a humerus 22 and a radius 24. As shown in FIG. 1, the humerus 22 is preferably curved upwardly away from the torso strut to assist in achieving a convex shape of humerus wing section 26 and to aid in creating lift. In a further embodiment, the radius is also convex in nature.

The humerus 22 is coupled to the radius 24, allowing the humerus 22 and radius 24 to move relative to each other. In one embodiment, the humerus 22 and radius 24 are integrally formed, having different properties to allow the humerus 22 and radius 24 to facilitate different movements of each portion of the wing. An example of this embodiment would be using a spring plastic that is thicker in the humerus 22 portion than the radius 24 to allow the radius 24 to have increased flexibility and mobility when compared to the humerus 22 during the various portions of the flight pattern. In the preferred embodiment shown in the figures, the humerus 22 is coupled to the radius 24 via a hinge. In a further preferred embodiment, the wing hinge 28 extends along the majority of the width of the wing. However, it can be appreciated that the hinge can also be adapted to be positioned only between the humerus 22 and radius 24.

The wing preferably includes a series of reinforcements 30 to provide stability to the wing. In this embodiment, the wing also includes a flexible wing material 32 (as shown in FIG. 1) on at least a top surface of the wings 18 and 20. In a further embodiment, wing material 32 is applied to both the top and bottom side of wing supports 32. In an alternative embodiment, the wings are constructed using a strong, but light metal, composite, or other suitable material. In this embodiment, the wings are optionally structured with overlapping panels allowing for some movement of the wings in the lateral plane if needed. In yet a further embodiment, the wings include louvers, similar to those seen in the aviation industry on airplanes, to provide improved and finer control of the flight experience. The louver position is manipulated to change the wing shape as needed during the take off, flight and landing experiences. As can be appreciated by a person skilled in the art, the louvers help to increase or decrease the camber, or surface area of the wings. This changes concavity of the lower surface of the wing or how convex the upper surface can be. Louvers can aid in take off and landing to control the amount of space needed to achieve either take off or landing. In an alternate embodiment, the radius and humerus can move in a forward and back direction indecently to adjust the wing shape.

Mechanics, such as motors, linkage mechanisms and electronics are preferably primarily positioned in a control cylinder 17 mounted on an arch 19 to space the mechanics from the athlete. In one embodiment, this arch 19 can be configured to support the user in a potential crash by acting like a roll bar. In an alternative embodiment the mechanics can be situated in any of the structural components, including but not limited to struts 6 and 8, or wing structures 22 and 24. In one embodiment, the humerus and radius are at least partially hollow to allow for the linkages to be internal. The hollow nature would further aid in weight reduction of the personal flying apparatus 2. In another embodiment, shown in FIG. 1, the control cylinder 17 has an inner piston which raises and lowers. This in turn raises and lowers cables 21 coupled on one end to the piston and on the other to the joint between the radius 24 and humerus 22. This control cylinder 17 is used to adjust the angle of the humerus relative to the torso struts 6 and 8 during flight.

To provide increased efficiency and battery life, the wings, in part, or in full can incorporate springs which are biased to the upmost phase of the wing motion. Thus, the battery, and drive system pull the wings down, and the springs either fully or partially return the wings to the upright position. This replicates bird mechanics as approximately four times the amount of muscle strength is required for the bird's downstroke compared to their upstroke. As can be appreciated the use of the word spring in this embodiment should not be limited to traditional springs but can include any material capable of biasing the wing to recoil on the upstroke, including but not limited to, metals, elastics, rubber, or other suitable material. In one embodiment, only the humerus section of the wings incorporates a spring. Alternative passive return mechanisms would be known to a person skilled in the art. Alternatively, the wings could be biased to the lowest position of the wing flight pattern.

In a preferred embodiment, the athlete is equipped with a tail apparatus located between or extending from the athlete's lower legs, below the knee. One example of a tail structure could be an elastic like sail material between the legs. The tail is used to help direct the flight path of the athlete, particularly to adjust the roll of the athlete during flight. In a further embodiment, there is optional fabric between the legs at a section above knee to add further lift and to aid with aerodynamics. As with the tail apparatus the leg fabric would be configured to ensure the users leg motion is unimpeded. In one embodiment, this is made of an elastic like material. Other configurations would be known to a person skilled in the art.

The apparatus further includes a processing unit 36 and battery 34. With the surge in battery related research and development, there are a plethora of possible lightweight batteries that can provide the required power to move the wings 18 and 20 to provide the required force to keep an athlete airborne.

This concept has also been proven in drone research where drones can hold payloads of hundreds of pounds. As an example, lithium-ion batteries can provide the required battery energy density necessary to power the personal flying apparatus 2. Alternatively, there has been substantial development in silicon-dominant battery chemistry which may provided greater battery energy density that current lithium-ion batteries, while providing faster charging. While a single battery 34 is shown in the figures, the inclusion of one or more additional batteries 38 would be understood to a person skilled in the art. These additional batteries could be secured in any suitable location to the personal flying apparatus 2, however, in a preferred embodiment, additional batteries 38 are coupled to the leg braces 10 and 12 as shown in FIG. 3.

The processing unit 36 is contains a controller which manages the wing flight pattern. It further controls the locking mechanism of the hinged connection of the torso struts 6 and 8 to leg braces 10 and 12 respectively. Additionally, the processing unit is coupled to an athlete user interface 40, shown as a screen in FIG. 3. The user interface is preferably coupled to an athlete helmet 42. The user interface is optionally coupled to one or more cameras which display can display the surroundings on the user interface 40. These one or more cameras can show the athlete, for example, the environment in front of them. The one or more cameras can also be used as input into a safety system which will redirect the athletes flight if there is an unexpected upcoming obstacle. Furthermore, in one embodiment, the processing unit can sense when a user is has rolled or pitched beyond a pre-set level and automatically adjust the roll, pitch or yaw to return the athlete to flying conditions within their pre-set range. The acceptable pre-set roll, pitch or yaw values, can be adjusted based on the experience of the athlete. For example, experienced athletes who would like to perform tricks, may choose not to have pre-set roll, pitch and/or yaw values. In contrast, a beginner athlete may set very narrow roll, pitch and/or yaw ranges to ensure they remain under control during their flight experience. The processing unit and/or controller preferably uses a plethora of sensors which are used as inputs into and AI software to automatically control flight responses to changes in wind currents or other environmental factors. The AI can be configured for a specific goal. For example, the AI could be configured to control the wings, flapping only when needed and gliding when possible. This would extend the battery life of the personal flying apparatus. Alternatively, the AI could be configured for speed, control or other aspect of the ariel flight experience. Since the personal flight apparatus is configured to human flight, the athlete can work in harmony with the AI for a particular flight experience. It is the combination of human athleticism and AI technology that will make the flight experience diverse, unique and customizable. Human athleticism can also compensate for any of the current downfalls of AI based technology in ornithopter flight.

The user interface further allows for the user to provide input to customize the flight experience. For example, the athlete can speed up or slow down the wing flight pattern, initiate landing, provide navigation information, show battery levels, display flight statistics, and show any incoming or surrounding risks. The user interface is preferably voice controlled to provide maximum speed of response and to allow for hands free interactions. In another embodiment, the user interface further includes touch screen technology.

In a preferred embodiment, the helmet is equipped with a support strut 45 to reduce athlete neck strain. This support strut 45 can be partly flexible, particularly to allow the user to raise their head to look forward. While this support strut is illustrated in FIG. 3 as a strut between the harness 15 and the helmet 42, it can be appreciated that other orientations that support the users head would be known to a person skilled in the art. For example, a headrest to support the user's forehead could also be used.

The personal flight apparatus 2 preferably includes parachute as a safety feature. In particular, the harness 15 is equipped with a parachute 43 which cooperates with a number of sensors to initiate release of the parachute if the athlete is in danger. For example, the processing unit receives input from sensors which monitor the elevation, rate of decent and system performance. If any of the sensor readings are outside of a predetermined normal range, the processing unit can issue a warning to the athlete and release the parachute. In alternate embodiments, the weight of the parachute can be supported by an additional frame or existing support structure to reduce the weight carried by the athlete.

While the present disclosure has focused on a personal flying apparatus for a single athlete, it can be appreciated that the structure could be easily adapted for tandem flying. For example, the harness could be tiered, such that a second user harness is coupled to and located below the first harness. This allows a second user to be positioned with their back against a first users stomach. Alternatively, two harness, torso and leg strut assemblies could be positioned in a side-by-side manner between the wings to allow for tandem flight.

Air Flight Pattern

Figure 6:
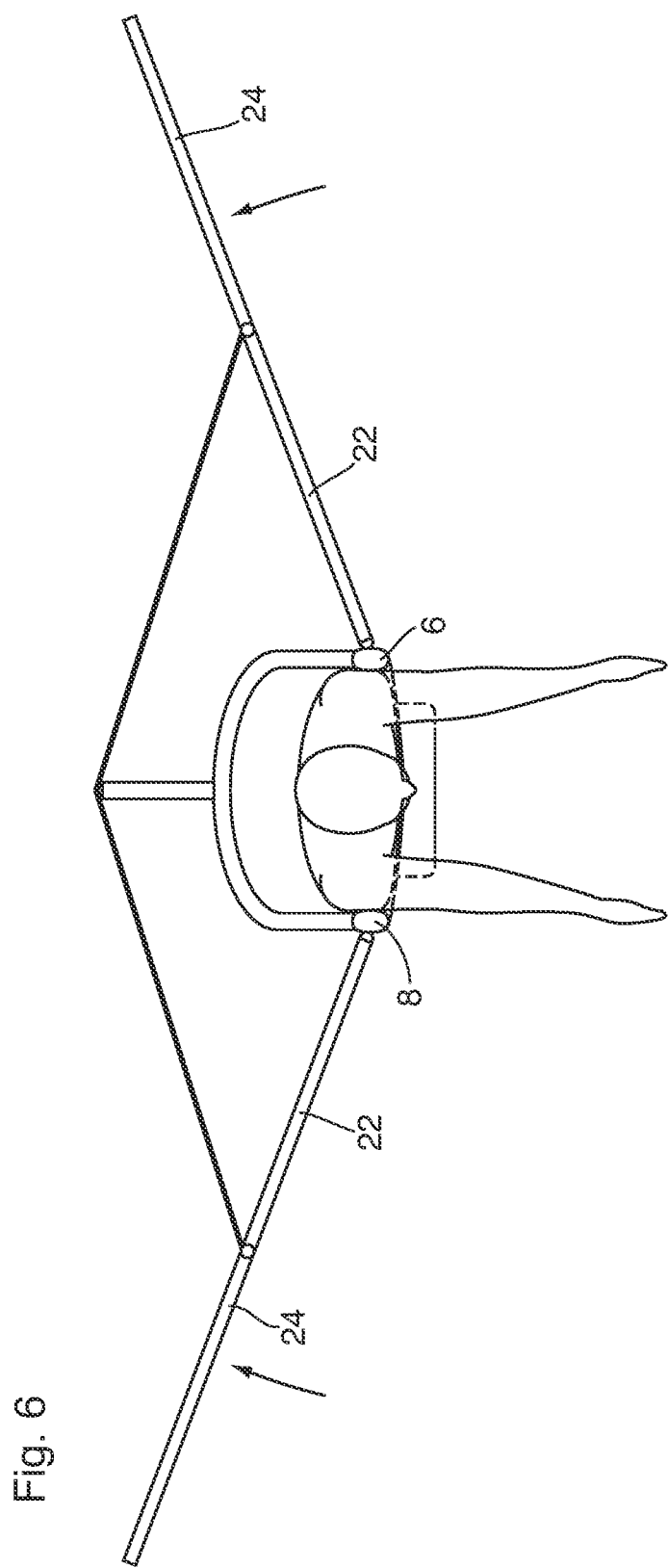
FIG. 6 is a frontal view of the personal flying apparatus with the wings in the highest position of the wing flight pattern.
Figure 7:
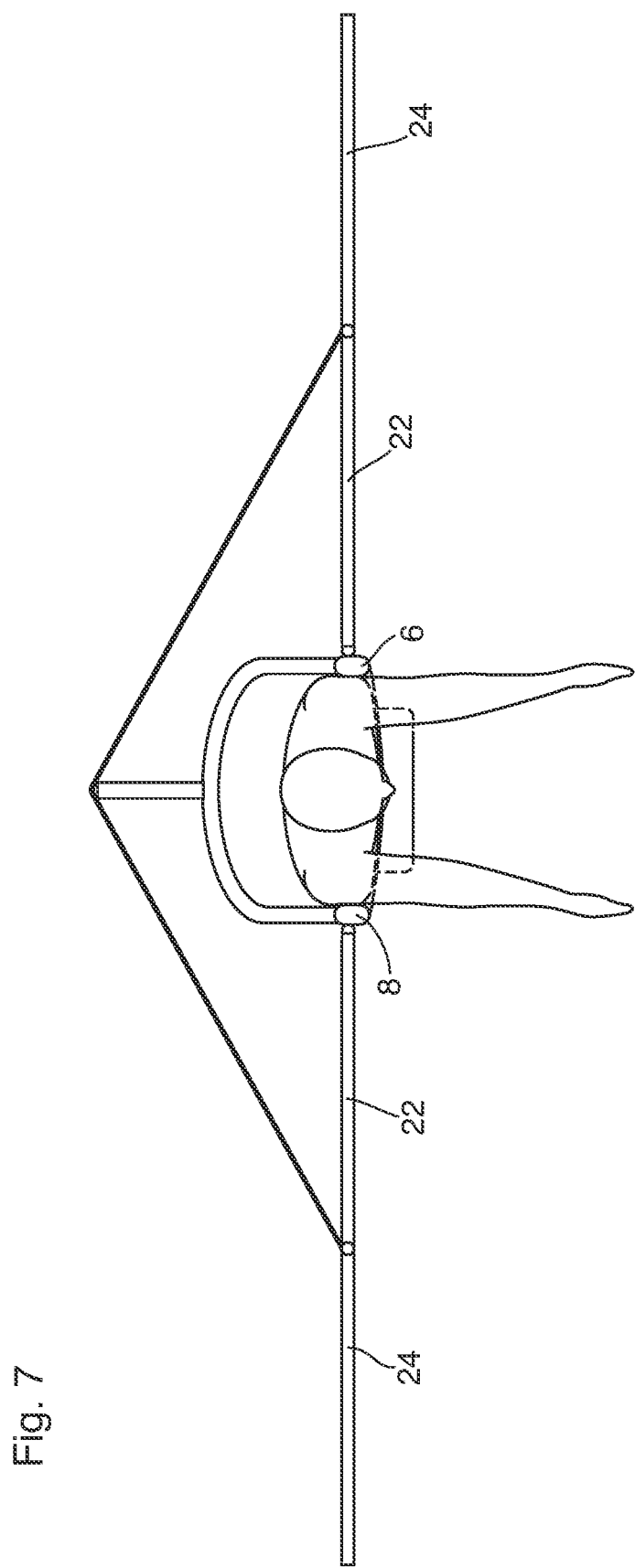
FIG. 7 is a frontal view of the personal flying apparatus with the wings in the horizontal position of the flight pattern.
Figure 8:
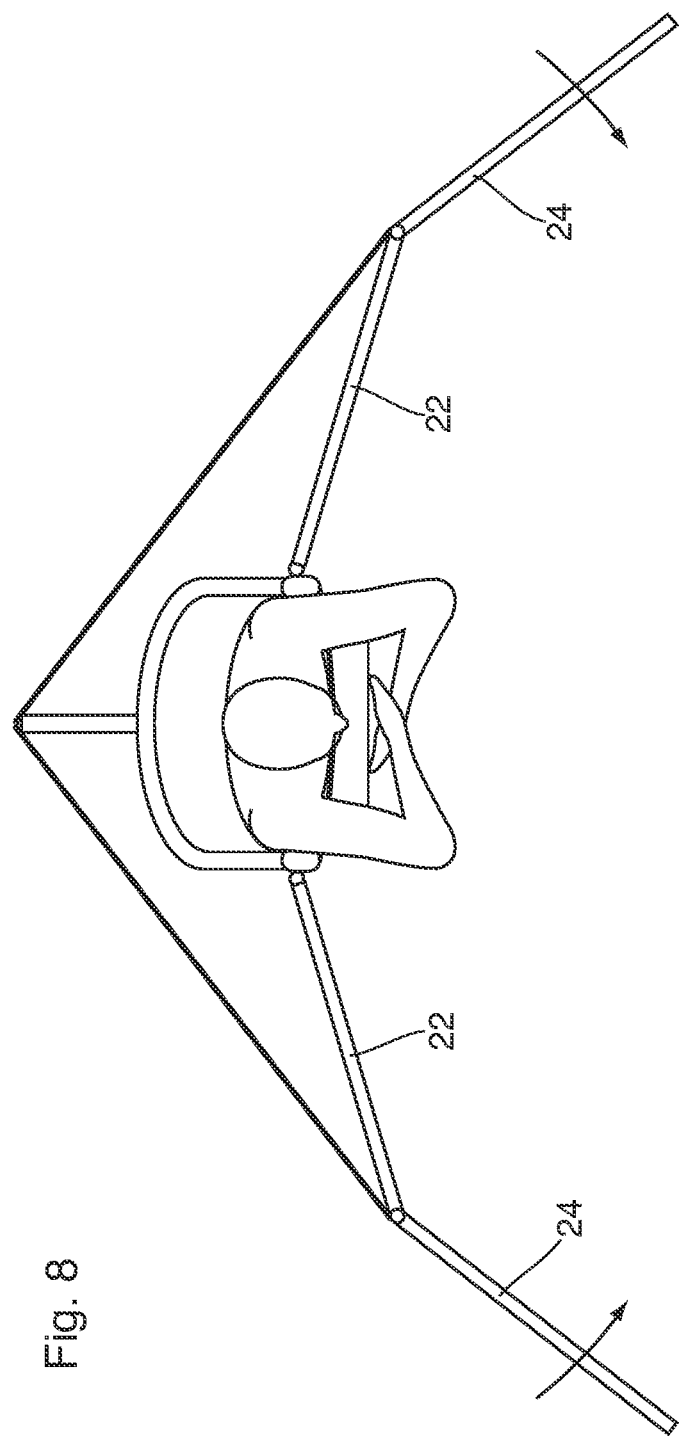
FIG. 8 is a frontal view of the personal flying apparatus with the wings in the radial decent phase of the wing flight pattern.
Figure 9:
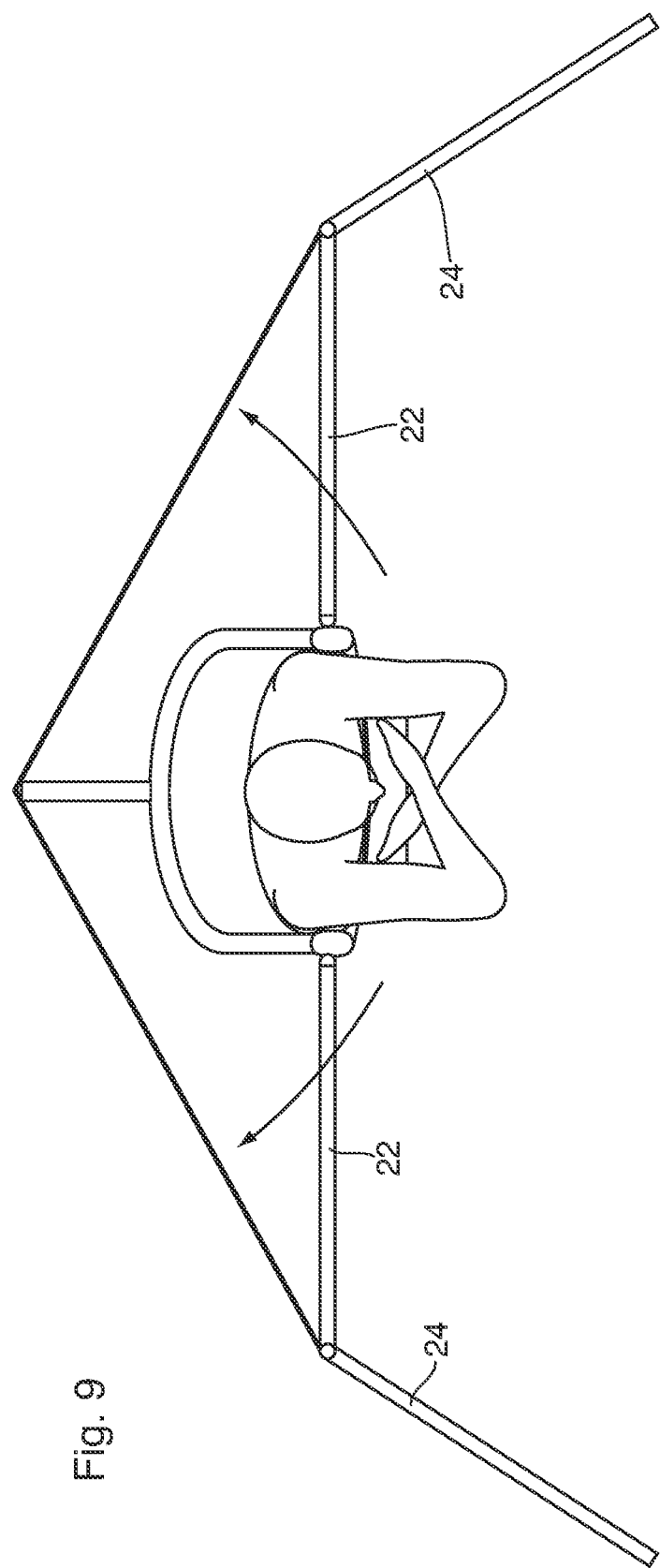
FIG. 9 is a frontal view of the personal flying apparatus with the wings in the preliminary return phase of the wing flight pattern.
Figure 10:
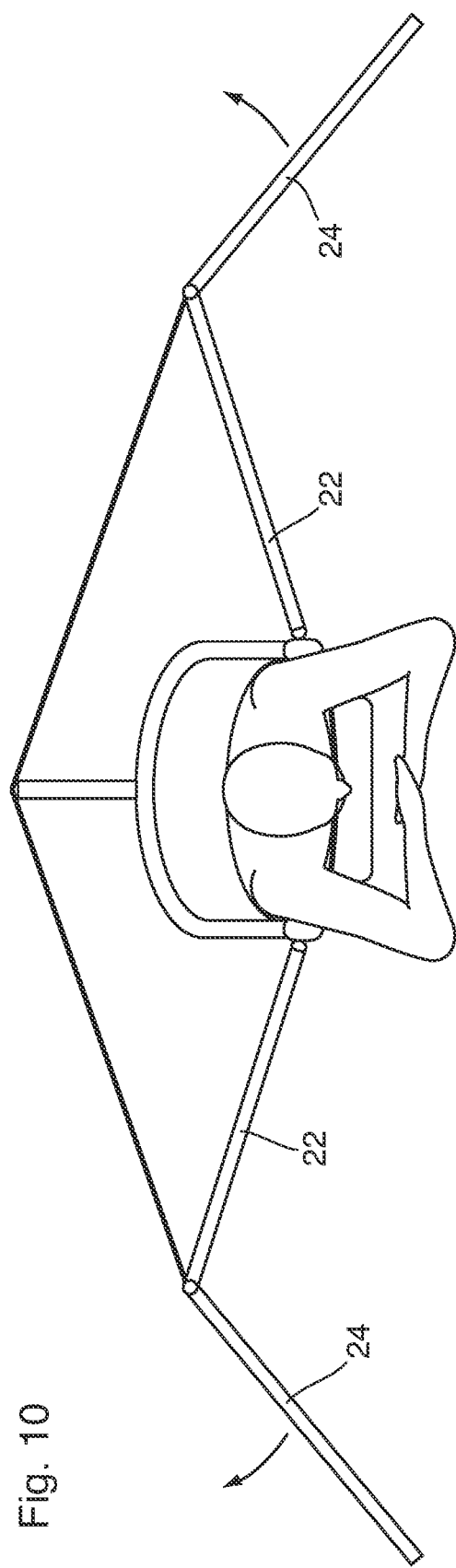
FIG. 10 is a frontal view of the personal flying apparatus with the wings in the final return phase of the wing flight pattern.

As disclosed above, the flight pattern of the wings is designed to mimic bird flight. The preferred mechanics of the wing flight pattern are shown in FIGS. 6 to 10. Once an athlete is airborne, a 4-step pattern is repeated to during flight and is powered by the battery 34. The highest position of the flight pattern is shown in FIG. 6. In this position, both the humerus 22 and radius 24 are raised upwardly from the torso struts 6 and 8. The humerus and radius are generally aligned in this phase. In the second phase, herein referred to has the preliminary decent, shown in FIG. 7, the wing lowers to a position wherein both the radius and the humerus are generally horizontal to the ground. The humerus 22 and radius 24 remain generally co-axial with each other throughout the preliminary decent. In a third phase, called the radial decent (shown in FIG. 8) the humerus 22 continues to descend but at a slower rate than the radius 24. The radius 24 rotates downward and inwardly relative to the humerus 22. This is the lowest part of the flight pattern. In a preferred embodiment, the humerus 22 is about 30 degrees below horizontal in the lowest most part of the flight pattern. In a fourth phase, referred to as the preliminary return phase of the flying pattern shown in FIG. 9, the radius 24 continues to remain downward relative to the humerus 22. Simultaneously, the humerus 22 rotates upwardly compared to the torso struts 6 and 8. This helps minimize resistance of the radial portion of the wing during the rise of the wings. FIG. 10 illustrates the final return phase of the flight pattern. During the final return phase, the humerus 22 continues to rotate upwardly relative to the torso strut 6 or 8. In a delayed manner compared to the humerus, the radius 24, rotates upward relative to the humerus 22 until it is generally inline therewith. At this point, the wings have returned to the highest portion of the fight pattern and the pattern repeats from FIG. 6 through 10 once more.

Figure 11:
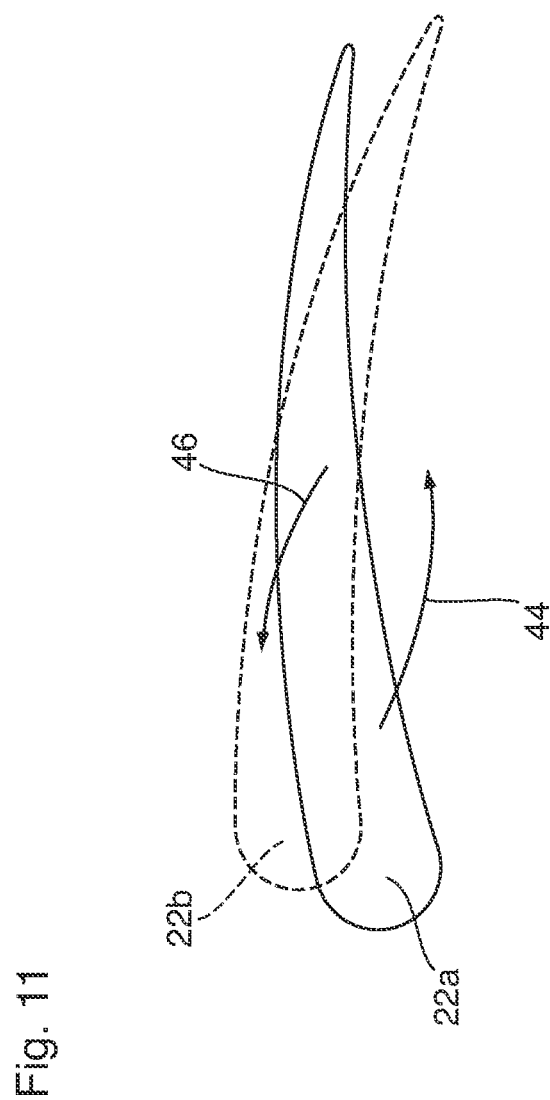
FIG. 11 is a cross-sectional view of the wing.

The flight pattern is optionally and preferably accompanied by a rotational motion at the joint between the humerus 22 in a vertical-longitudinal plane of the flying apparatus 2 along the connection between the humerus 22 and the torso strut 6 or 8. This forward rotational motion is illustrated in the cross view of the humerus 22 in FIG. 11. The rotation motion generally follows an elliptical-like pattern. As the wing is brought through the preliminary decent and the radial decent phase, the humerus rotates forward and downwardly through the elliptical pattern in such a manner that the wing position generally changes from 22b to 22a as shown by motion arrow 46. The downward rotational phase 46 preferably occurs at a faster speed than the slower backward rotational phase 44 to provide a downward thrust force. The speed of the forward rotational phase 46 aids in providing power and lift to the preliminary decent and radial decent of the flight pattern. As shown in FIG. 11, the rotation of the humerus 22 compared to the torso strut 6 or 8 also allows for a change in the wing orientation in a horizontal plane. During the downward rotational phase 44, the humerus dips downwardly from 22b to 22a, which raises the trailing edge of the wing and decreases the possible downward force of the wing during the return phase. This is shown by the humerus position 22a. During the preliminary return phase and final return phase, shown in FIGS. 9 and 10, the humerus rotates backwards and upwards as shown by motion arrow 44. During this backward rotational motion 44, the humerus rotates to position the wing from 22a back to 22b to keep the wing generally parallel to the torso struts. This position, in combination with the concave lower surface of the wing increases lift forces. While one possible rotational pattern to increase flight performance is disclosed herewith, alternatives would be known to a person skilled in the art or by observing alternate patterns of bird flight.

While in the preferred embodiment, the motion of the wings would be controlled by the processing unit and controller, it should be noted that hand controls, voice commands, a joystick or any other suitable control mechanism or combination of control mechanisms could also be used.

Figure 12:
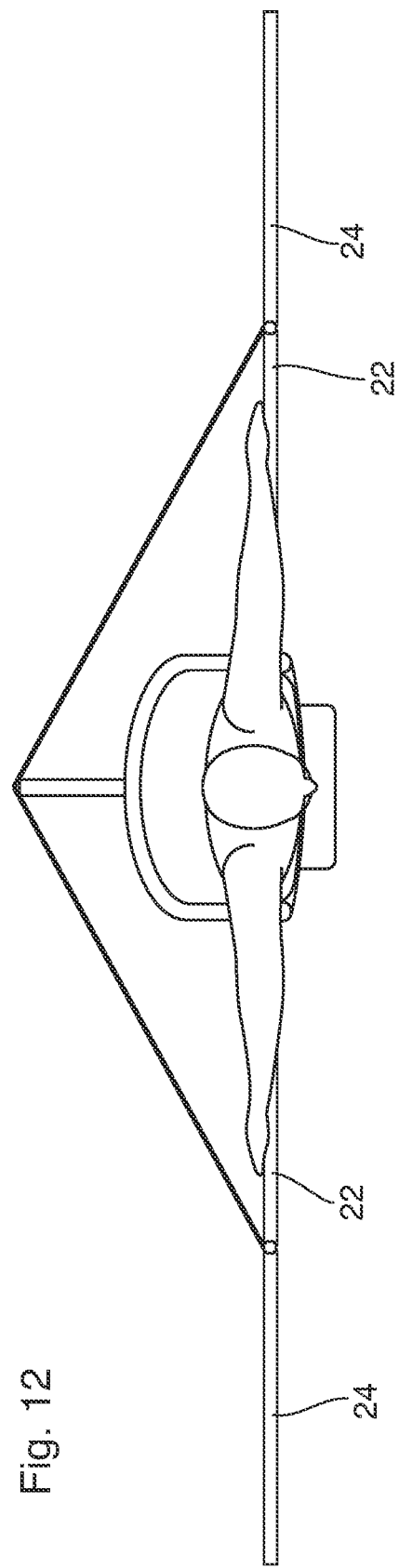
FIG. 12 is a frontal view of the personal flying apparatus with the user in a glide position.
Figure 13:
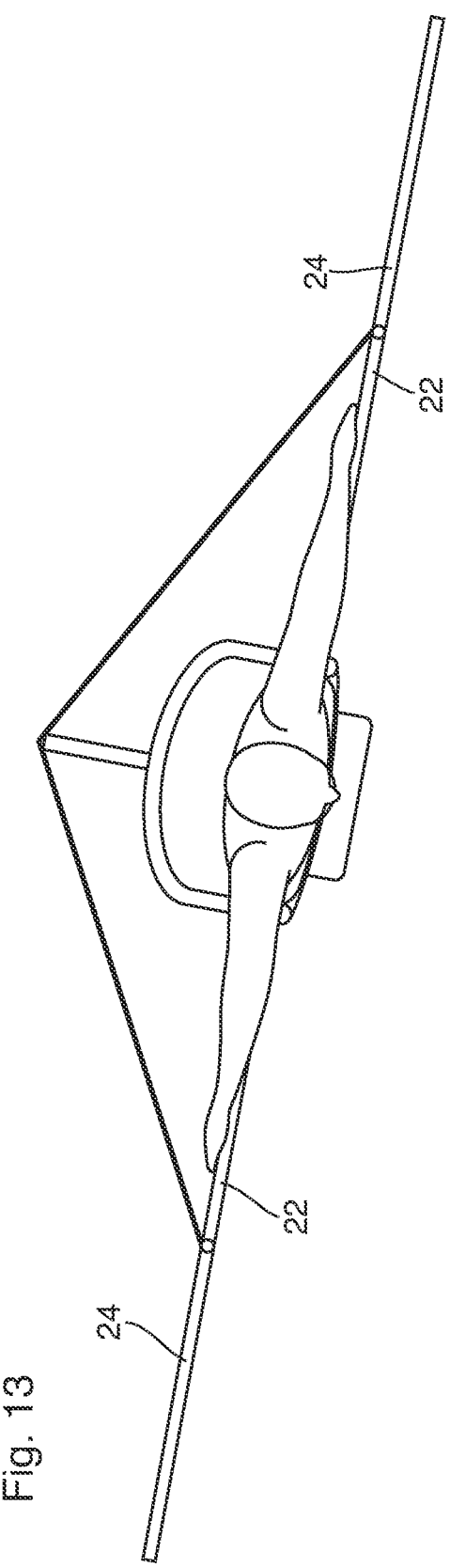
FIG. 13 is a frontal view of the personal flying apparatus with the user in a banking position.

The athlete can at least partially control the trajectory of their flight by controlling the roll of the flight apparatus 2. As shown in FIG. 12, straight flight is achieved by keeping the wings generally parallel to the ground. The control mechanisms, for example, but not limited to, voice command, a joystick or other suitable controller can be used to initiate banking as shown in FIG. 13. This allows the user to turn and direct their flight.

Take Off

While there are multiple methods of take off, there are three preferred methods what will be described herein: the cliff method, a ramp method and a power-up method.

a) The Cliff Method

Figure 14:
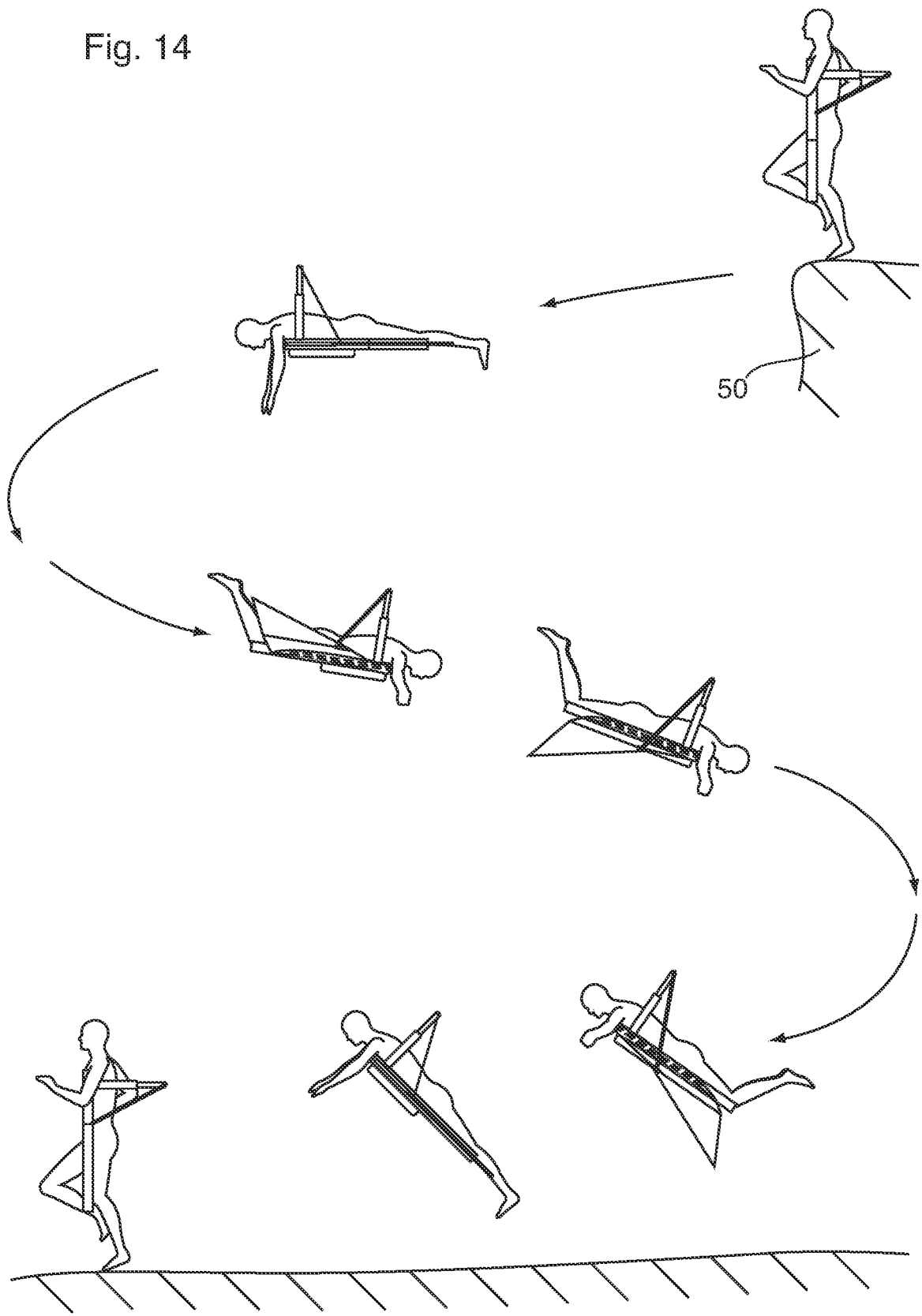
FIG. 14 is left side view showing a take off and landing sequence.

In a preferred embodiment shown in FIG. 14, an athlete can commence flying by running with the wings in a take off position. For this method, the wings would be adapted to have a medial strut support of the medial edge of the wing to allow for rotation of the humerus relative to the torso strut. In the take off position, the wings are angled backward and generally parallel to the ground so only the leading edge of the humerus and radius are cutting through the air. Alternatively, in one embodiment the wings are capable of folding in to reduce the drag of the air as the athlete runs towards an elevated edge 50, such as a cliff or the edge of a building or platform. During the run, the leg braces 10 and 12 freely rotate at the hinged connection 14. This allows the athlete to run generally unimpeded. As the athlete runs off the elevated edge 50, they propel themselves forward, tipping themselves forward into the flying position so they are generally parallel to the ground. At this point in the take off sequence, the hinged connection 14 locks the leg braces 10 and 12 in a straight line with torso struts 6 and 8 respectively. Simultaneously, the wings move from a take off position to a flight position and the air flight wing pattern begins.

b) The Ramp Method

FIG. 15 illustrates a second possible method of take off. The ramp method is advantageous in areas where elevated surfaces, such as cliffs, are unavailable. The ramp can be built in any location with sufficient space. The athlete lies on a roller board 52 on a platform 54 at the top of a ramp. The athlete is preferably lying stomach down and generally parallel to the ground with the leg struts 10 and 12 preferably locked in an inline position with the torso struts 6 and 8 respectively. The wings are outstretched, preferably in a position generally parallel to the ground. To initiate take of the athlete pulls the roller board 52 over the edge of the platform 54 and allows speed to build as the roller board 52 rolls down the ramp 56. Once sufficient speed has been achieved, the wing flight sequence commences and lifts the athlete from the roller board 54. In one embodiment, the wing flight sequence commences at the bottom of the ramp, approximately at point 68.

In a preferred embodiment, the roller board 54 has wheels 58 which run in tracks 60. This ensures that the roller board 52 follows a known and predictable path and keeps the roller board 52 coupled to the ramp without lift.

c) Power-Up Method

In another embodiment, the user is held in a support structure in an elevated and horizontal position. The wings are engaged to flap and the user is lifted from the support via the power of the wings. Alternatively, the harness is clipped into the support and the user is not released until sufficient power has been generated by the flapping wings to elevate the user safely.

Landing

When the athlete is prepared to land, they initiate a landing sequence through the user interface 40. This prompts the processing unit 36 to adjust the wing flight pattern and wing configuration to initiate slow and controlled the decent of the athlete towards the ground. Sensors are used to monitor the athlete's elevation. Once the athletes are lowered to a suitable elevation, the processing unit initiates the release of the locked hinged connection 14 which allows the leg struts 10 and 12 to move independently from the torso supports 6 and 8, respectively. The athlete allows their legs to drop and moves to a more upright position. This not only allows the athlete to meet the ground with their legs in motion to absorb the shock and momentum of the landing, but also puts the wings in a position that is generally perpendicular to the ground. This allows the wings to act as strong breaks to slow the athlete and reduce the momentum and speed that must be overcome to bring the athlete to a stop.

In a preferred embodiment, the athlete slows themselves, by turning, slowing the speed of the wings through the flight pattern or by adjusting the configuration of the wing with louvers. In a preferred embodiment, the wings have louvers on the trailing edge thereof that are pulled inwardly to shorten the length of the wing and decrease the concavity of the bottom surface thereof. As the athlete reaches the ground and their leg braces are released, the louvers can extend upward to provide a drag force to slow the athlete. This louver activation pattern mimics that used in aircraft flight.

In an alternative embodiment, the athlete can simply use a parachute to facilitate landing.

We claim:

1. A personal flying apparatus comprising:
   a body structure adapted to support and detachably couple a user thereto; and
   a pair of wings rotationally coupled to opposite sides of the body structure and powered by a battery; and
   wherein the body structure comprises a torso portion and a leg portion;
   the leg portion being hingedly coupled to the torso portion;
      wherein the torso portion is configured to hold a user therein and a pair of torso supports are positioned at opposite lateral sides of torso portion;
         the pair of wings being rotationally coupled to the pair of torso supports respectively;
      the leg portion comprising a pair of leg struts configured to be coupled to a user's legs and the leg struts being free to move independent of one another;
   said leg portion is moveable between a rotatable position wherein the leg portion rotates freely relative to the torso portion and a locked position wherein rotation is inhibited;
   wherein the leg portion rotates freely relative to the torso portion during a take off phase and a landing phase of flight and is fixed in an inline position thereto during flight;
   the pair of wings extending backwardly from a front portion of the pair of torso struts to a rear portion of the leg struts and having at least a humerus portion and radius portion;
   the radius portion is configured to rotate relative to the humerus;
   wherein the pair of wings each include a series of structural braces extending rearwardly from the humerus and radius to provide structural support; the structural braces being curved to provide a concave bottom surface of the of wings; and
   wherein, during use, the wings mimic the motion of bird flight.

2. The personal flying apparatus as claimed in claim 1 wherein the pair of wings each include at least one adjustable louver to facilitate changes in wing length or shape.

3. The personal flying apparatus as claimed in claim 1 wherein the wings are biased to an upward position.

4. The personal flying apparatus as claimed in claim 1 wherein the humerus and radius are configured to move independently of each other in a forward/back direction to adjust the shape of the wing.

5. The personal flying apparatus as claimed in claim 2 further comprising a central processing unit for controlling the motion of the pair of wings.

6. The personal flying apparatus as claimed in claim 5 further comprising a series of sensors for sensing elevation, and possible obstacles; the sensors used as input to the central processing unit; the central processing unit using the sensor input to determine if a change in flight path is necessary.

7. The personal flying apparatus as claimed in claim 6 further comprising a user interface to receive input from the user; the input being processed by the central processing unit to control the flight experience.

8. The personal flight apparatus as claimed in claim 7 wherein the user interface is in the form of a screen mounted on a helmet.

9. The personal flight apparatus as claimed in claim 8 wherein the battery is a lithium-ion battery.

10. The personal flight apparatus as claimed in claim 7 wherein the battery is a silicon-dominant battery.

* * * * *